United States Patent [19]

Suzuki et al.

[11] Patent Number: 5,786,918
[45] Date of Patent: Jul. 28, 1998

[54] OPTICAL COMMUNICATION SYSTEM AND OPTICAL TRANSMITTING DEVICE

[75] Inventors: Masatoshi Suzuki, Kawashima-Saitama; Hidenori Taga, Sakado; Noboru Edagawa, Tokyo; Hideaki Tanaka; Shu Yamamoto, both of Shiki; Shigeyuki Akiba, Tokyo, all of Japan

[73] Assignee: Kokusai Denshin Denwa Kabushiki Kaisha, Tokyo, Japan

[21] Appl. No.: 575,174

[22] Filed: Dec. 19, 1995

Related U.S. Application Data

[63] Continuation of Ser. No. 266,135, Jun. 27, 1994, abandoned.

[30] Foreign Application Priority Data

Sep. 8, 1993 [JP] Japan .................. 5-246085

[51] Int. Cl.$^6$ .................. H04J 14/08; H04B 10/00
[52] U.S. Cl. .................. 359/135; 359/161; 359/173; 359/179; 375/289
[58] Field of Search .................. 359/122, 135, 359/138, 156, 161, 173, 179, 181, 186, 188; 375/285, 292, 296, 297, 242, 289

[56] References Cited

U.S. PATENT DOCUMENTS

| | | | |
|---|---|---|---|
| 4,439,857 | 3/1984 | Rauth et al. | 359/135 |
| 4,922,249 | 5/1990 | Cointot et al. | 375/289 |
| 4,980,891 | 12/1990 | Izadpanah | 359/138 |

FOREIGN PATENT DOCUMENTS

| | | | |
|---|---|---|---|
| 2187365 | 9/1987 | United Kingdom | 359/135 |
| 2007430 | 4/1992 | WIPO | 359/188 |

OTHER PUBLICATIONS

Chu et al. "Mutual Interaction Between Solitons of Unequal Amplitudes in Optical Fiber".
P. L. Chu and C. Decem. "Mutual Interaction Between Solitons of Unequal Amplifiers in Optical Fibre," *Electronics Letters*, vol. 21, No. 24 (Nov. 21, 1985), pp. 1133–1134.
I. M. Uzunov, V. D. Stoev and T. I. Tzoleva, "N–soliton interaction in trains of unequal soliton pulses in optical fibers," *Optical Letters*, vol. 17, No. 20 (Oct. 15, 1992), pp. 1417–1419.

*Primary Examiner*—Kinfe-Michael Negash
*Attorney, Agent, or Firm*—Emmanuel J. Lobato; Burns & Lobato, P.C.

[57] ABSTRACT

An optical communication system of a construction wherein the average wavelength dispersion value of the transmission optical fiber used, the optical output intensity of each optical amplifier repeater inserted in the transmission optical fiber and the widths of return-to-zero optical pulses transmitted over the transmission line are determined so as to compensate for the pulse compression effect by the nonlinear optical effect produced on the optical pulses by the pulse spreading effect by the wavelength dispersion effect. An optical multiplexer in the optical transmitting device time-division multiplexes the return-to-zero optical pulses, and the optical multiplexed signal is provided as an alternating-amplitude optical signal with the amplitudes of the return-to-zero optical pulses alternated.

13 Claims, 4 Drawing Sheets

OPTICAL COMMUNICATION SYSTEM AND OPTICAL TRANSMITTING DEVICE

This is a continuation of application Ser. No. 08/266,135, filed Jun. 27, 1994 now abandoned.

BACKGROUND OF THE INVENTION

The present invention relates to an optical communication system using optical fibers and, more particularly, to a long-distance, large-capacity optical soliton communication system employing optical amplifiers and an optical transmitting device for use in such a system.

Buttressed by development of optical amplifying techniques, optical fiber communication technology has made rapid-paced progress toward ultra-long-distance communication, now allowing implementation of a transpacific communication system without the need of using regerative repeaters. At increased transmission rate, however, conventional transmission systems suffer serious degradation of their transmission characteristics that are caused by the wavelength dispersion characteristic and nonlinear optical effect of optical fibers, imposing sever limitations on the realization of a high-speed, high-capacity transmission system. In recent years, an optical soliton communication system has been in the limelight as a system that will break the bottleneck in the speedup of transmission by the wavelength dispersion characteristic and the nonlinear optical effect. The optical soliton communication system is a system that positively utilizes the wavelength dispersion characteristic and nonlinear optical effect of optical fibers which are major factors to the degradation of characteristics of the conventional transmission systems and that transmits optical short pulses intact by balancing optical pulse width expansion owing to the wavelength dispersion by the optical fibers with pulse width compression based on the nonlinear optical effect.

It is in the last few years since the emergence of optical amplifiers that the long-distance optical soliton communication system has come to particular attention as a communication system which has the potential for dramatically increasing the transmission capacity of optical communication systems. The optical soliton communication system, which stably transmits optical pulses without changing their waveforms intensities, is predicated on the assumption that the transmission medium used produces no transmission or propagation loss, but since ordinary optical fibers cause such a loss, the light intensity attenuates with increase of transmission distance so that and the nonlinear optical effect lessens and loses its balance with the wavelength dispersion effect. Hence, to implement apparently loss-free fiber optic transmission while maintaining the light intensity at some value, it is necessary that any loss by optical fibers be compensated for by optical amplifiers. When optical amplifiers are used as repeaters, it is possible to realize soliton communication with practically no waveform variations of optical pulses as in the case of ideal soliton transmission, by setting an average power of optical pulses transmitted between adjacent repeaters and the average wavelength dispersion of optical fibers to soliton conditions.

In comparison with an optical amplification system using ordinary non-return-to-zero pulses, an optical amplification system of the type employing optical soliton pulses has advantages in the potential for extension of the transmission capacity, easy multiplexing and freedom from degradation by the nonlinearity of optical fibers, and much study is being given this system.

In the optical soliton communication, however, optical amplifier noise affects the timing jitter of optical pulses at the receiving end and eventually deteriorates the transmission characteristic of optical pulses. That is, optical soliton pulses with noise superimposed thereon undergo random fluctuations of their light intensity and slightly deviate in shape from ideal optical soliton pulses, causing fluctuations in the shift amount of the carrier frequency by the nonlinear optical effect. Since this is repeated for each repeater, each arrival time of optical pulses randomly fluctuates during their propagation in optical fibers each having a limited wavelength dispersion value, incurring the timing jitter at the receiving end. This phenomenon is called the Gordon-Haus effect, which is a major limiting factor to the transmission characteristic of the optical soliton communication.

In the transmission of a plurality of optical soliton pulses having information, the waveforms of respective soliton pulses do not deteriorate, but if the pulse interval is too short, it is observed that adjacent soliton pulses attract or repel each other by virtue of their interactions. This also constitutes the timing jitter at the receiving end, and hence is not preferable for the application to communications. To suppress the interactions of soliton pulses, it is necessary to open up the space between adjacent soliton pulses to some extent. With a view to overcome the timing jitter problem, there have been intensively studied soliton pulse control techniques for artificially reducing the timing jitter, and soliton transmission experiments have made rapid progress in the last few years. There are two approaches to controlling soliton pulses: one is to control a random frequency shift by an optical filter in the frequency domain, and the other is to directly control the timing jitter itself in the time domain.

The control in the frequency domain is effected by applying soliton pulses to a narrow optical bandpass filter provided after the optical amplifier so that the random frequency shift, which is the cause of the timing jitter, is made to approach the center frequency of the filter. This filter is commonly referred to as a frequency guiding filter since it guides in the frequency domain the soliton pulses which are likely to deviate from their center. The bandwidth of the filter is narrow, about 5 to 10 times the spectral width of the soliton pulses. In the frequency guiding with the center frequency of the filter fixed, however, noise accumulates; to avoid this, a method of slightly sliding the center frequency of the optical filter with increase of distance has also been studied and this filter is commonly called a sliding frequency guiding filter. The soliton component, which is a nonlinear wave that propagates while generating frequency chirping, responds to even a slight variation in the center frequency of the filter, but noise component which is a linear wave does not respond to a frequency shift of the filter and is gradually driven out of the band of the filter, with the result that the accumulation of noise is suppressed. The slide amount of the center frequency is around 6 GHz per 1000 km.

It is very difficult, however, to apply these narrow band optical filters to actual systems for the reasons given below. That is, the frequency of light is about 200 THz, and in the sliding frequency guiding filter, for instance, the absolute value of its center frequency needs to be shifted by 200 MHz or so (an accuracy of 0.0001% with respect to the center frequency) for each repeater. Taking into account the present technical level and similar environmental changes such as a temperature change of the actual system, precise control of such a narrow band optical filter would be almost impossible in the actual system. Taking into consideration the application of optical soliton communication to optical submarine cables, the prior art which accompanies the use of an ultra-narrow band optical filter in the repeater which is required to be highly reliable is undesirable from the practical point of view such as the long-term reliability of the system.

On the other hand, the method of control in the time domain is a 2R repeater (Retiming, Reshaping) system in which optical modulators are inserted in the transmission line at intervals of hundreds of kilometers and are modulated at timing-synchronized clock frequencies, whereby optical pulses accompanied by the timing jitter are forced to be waveform-shaped and synchronized in timing. With this method, the waveform shaping causes a random change in the amplitude of each soliton pulse, and hence introduces instability in operation; to absorb it, it is also necessary to effect control in the frequency domain (by inserting narrow band filters of a bandwidth about five times larger than the soliton bandwidth). According to this method, however, since wavelength multiplexing is not easy and since the 2R repeater portion requires high-speed optical circuits and high-speed electrical circuits such as a high-speed photodetector, a high-speed optical modulator and a high-speed driver, enhancement of the transmission capacity is limited in terms of the response speed of optical components and the response speed of electrical parts, not in terms of the property of the optical soliton pulses. Moreover, the prior art which involves complex processing using an optical modulator in the repeater required to be highly reliable is not desirable from the practical viewpoint such as the longterm reliability of the system. It is important that the transmission line containing optical amplifiers be simplified as much as possible.

SUMMARY OF THE INVENTION

An object of the present invention is to provide an ultra-high-speed, large-capacity optical communication system including a soliton transmission capability which reduces the timing jitter resulting from soliton interactions and lessens the influence of the Gordon-Haus timing jitter, and an optical transmitting device for use in such an optical communication system.

To attain the above-noted objective, the optical communication system according to the present invention comprises: an optical fiber transmission line having a required number of optical amplifier repeaters connected to a transmission optical fiber at desired intervals; an optical transmitting device which transmits to the optical fiber transmission line optical multiplex signals obtained by time-division multiplexing return-to-zero optical pulses having digital information with an optical multiplexer; and an optical receiving device which receives the optical multiplexed signals from the optical fiber transmission line and demultiplexes it by an optical demultiplexer into respective original optical signals. The optical communication system is constructed so that an average wavelength dispersion value of the transmission optical fibers, an optical output intensity of each optical amplifier repeater and the widths of return-to-zero optical pulses are determined so as to compensate for a pulse compression effect based on the nonlinear optical effect exerted on the optical pulses by the pulse spreading effect based on a wavelength dispersion effect. The optical multiplexer in the optical transmitting device time-division multiplexes the return-to-zero optical pulses into optical multiplexed signals to have alternate amplitudes of the return-to-zero optical pulses. The optical demultiplexer in the optical receiving device is made up of an optical splitter which splits the optical multiplex signals into a plurality of optical signals and an optical time-division demultiplexer whereby each repetition rate of each branched optical signal to an original transmission rate by a rectangular synchronous optical gate waveform of a width about the same as the full time slot at the transmission rate after multiplexing.

The optical transmitting device according to the present invention, which transmits return-to-zero optical pulses having digital information after time-division multiplexing them by the optical multiplexer, has a construction in which the optical multiplexer time-division multiplexes the return-to-zero optical pulses and the resulting optical multiplex signal has alternate amplitude optical signal with the amplitudes of the return-to-zero optical pulses.

According to the present invention, to reduce the timing jitter resulting from soliton interactions, the optical transmitting device performs optical time-division multiplexing and uses, as transmission signals, alternate-amplitude soliton pulses whose amplitudes change in an alternating sequence.

The soliton interactions are caused by the overlapping of tails of adjacent pulses. When the soliton pulses are propagated through an optical fiber, phases in the soliton pulses change with distance of propagation, but in the case of constant-amplitude soliton pulses, the relative phase of adjacent soliton pulses always remains constant throughout the propagation. When adjacent soliton pulses are in-phase, the amplitudes of their overlapping portions increase, since the amplitudes are each expressed by a simple sum of overlapping of pulse tails. Now, consider two pulses, for instance. The fall portion of the first pulse and the rise-up portion of the second pulse become larger than that in the case of an isolated pulse. Consequently, the slope of the pulse overlapping portion is gentle, and hence frequency chirping by the self-phase modulation based on the nonlinear optical effect of the optical fiber becomes small, making it impossible to fully compensate for the pulse spreading owing to the wavelength dispersion by the optical fiber. Since this effect increases as the overlapping of the pulses increases, their overlapping portion becomes larger as the pulses propagate. In consequence, the two pulses are attracted to each other to form one pulse apparently and the frequency chirping becomes dominant, giving rise to a phenomenon that the pulse is separated again. When soliton pulses of the same amplitude are propagated, this soliton interaction is repeated periodically, since their phase conditions are the same.

On the other hand, soliton pulses of different amplitudes become in-phase during propagation only after they have propagated over a very long distance, since their phase changes with the distance of propagation differ from one another with respect to amplitudes. Hence, the overlapping of two soliton pulses does not directly cause an increase in the amplitude and the soliton interaction can be suppressed accordingly.

To lessen the influence of the Gordon-Haus timing jitter, the optical receiving device has a construction in which the multiplexed signals are received after being divided on the time axis by an optical time-division demultiplexer which provides a synchronous optical gate waveform corresponding to the full time slot of the transmission rate.

The error rate characteristic at the time of receiving an optical signal having the timing jitter is determined by the value of the magnitude of the timing jitter relative to the permissible time width of the optical receiver. For example, in the case where the average value of the timing jitter is 5 ps and the permissible time width of a 10 Gb/s optical receiver is 60 ps, the relative value of the timing jitter to the permissible time width is ½; in this instance, assuming that the timing jitter has a Gaussian distribution, the code error rate is estimated to be about $10^{-9}$.

With the construction that receives the multiplexed signals after time-division demultiplexing it to 5 Gb/s by the optical time-division demultiplexer which provides a 100 ps synchronous optical gate waveform corresponding to the full time slot of the transmission rate, the relative value of the timing jitter to the permissible time width is ¹/24; hence, an optical signal having about 5 ps timing jitter can be received with no error involved. To capture all the pulses having stochastically distributed timing jitter after their time-division demultiplexing, it is effective to time-division demultiplex them with a wide synchronous optical gate waveform corresponding to the full time slot of the transmission rate. By this, it is possible to significantly lessen the influence of the timing jitter on the code error.

BRIEF DESCRIPTION OF THE DRAWINGS

The present invention will be described in detail below with reference to the accompanying drawings, in which.

PREFERRED EMBODIMENTS OF THE INVENTION

[Embodiment 1]

Figure 1:
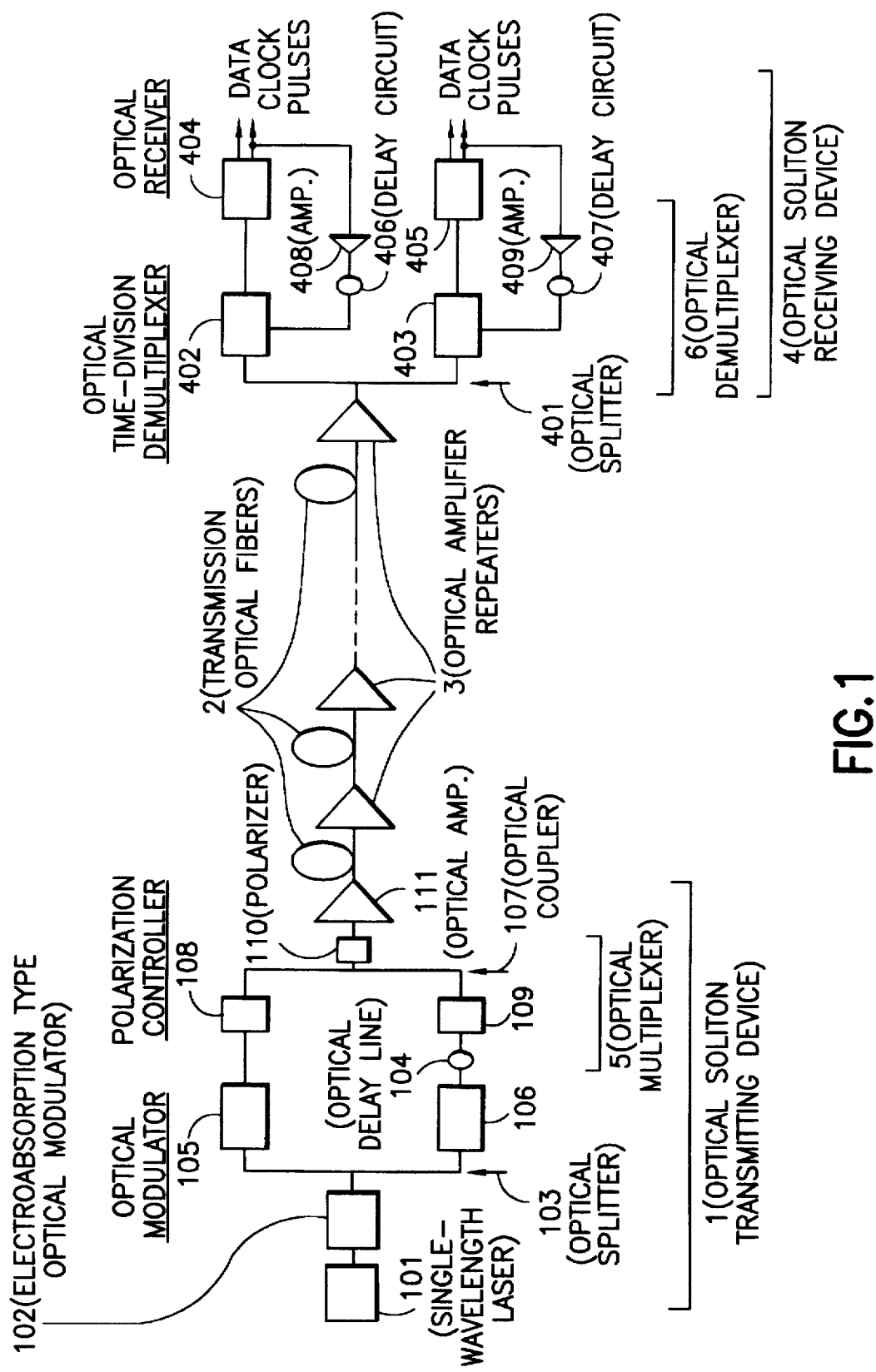
FIG. 1 is a block diagram explanatory of Embodiment 1 of the present invention.

FIG. 1 illustrates an embodiment of the present invention. Reference numeral 1 denotes an optical soliton transmitting device, 2 transmission optical fibers, 3 optical amplifier repeaters, 4 an optical soliton receiving device, 5 an optical multiplexer and 6 an optical demultiplexer.

The optical soliton transmitting device 1 comprises a single-wavelength laser 101, an electroabsorption type optical modulator 102 which serves an optical soliton pulse train generating part, an optical splitter or coupler 103, optical modulators 105 and 106, the optical multiplexer 5 and an optical amplifier 111 which includes an optical bandpass filter for eliminating noise. The optical multiplexer 5 is made up of an optical delay line, polarization controllers 108 and 109, an optical coupler 107 and a polarizer 110. The oscillation wavelength of the single-wavelength laser 1 is 1556 nm. The electroabsorption type optical modulator 102 is formed by an InGaAsP electroabsorption type optical modulator, which is supplied with a 7.1 V reverse bias and a 5 GHz sinusoidal voltage of 27 dBm and generates a train of optical soliton pulses having a 22 ps pulse width. The soliton pulse train is separated by the optical splitter 103 into two pulse trains: one is subjected to 5 Gb/s pseudorandom modulation by the optical modulator 105 and the other is subjected to 5 Gb/s pseudorandom modulation by the optical modulator 106 and relatively delayed for 100 ps from the other pulse train by the optical delay line 104. The optical signals of both pulse trains are combined by the optical coupler 107 to generate a time-division multiplexed 10 Gb/s pseudorandom optical signal. The polarization controllers 108 and 109, disposed at a stage preceding the optical coupler 107, are used to change the state of polarization of the both pulse trains, thereby changing the amplitude values of the optical pulses of the respective trains after their passage through the polarizer 110. This implements alternating-amplitude soliton signals with the amplitudes of adjacent soliton pulses alternated. The optical soliton transmitting device 1 may include an optical amplifier for compensating for a loss by each optical part.

The total length of the transmission optical fiber is about 9000 km and the average wavelength dispersion value is set to 0.47 ps/km/nm. To compensate for optical fiber loss, 300 erbium-doped fiber optical amplifier repeaters 3 are disposed at intervals of around 30 km. In order that the average optical power of each 30 km span may satisfy soliton conditions, the average optical output power of each optical amplifier repeater is set to a value of minus 4.8 dBm. Incidentally, the soliton peak power $P_{sol}$ that satisfies the soliton conditions in the case of no fiber loss is expressed by the following equation (1).

$$P_{sol}=0.776\lambda^3 \cdot A_{eff} D/(\pi^2 \cdot c \cdot n_2 \tau^2) \tag{1}$$

(where $\lambda$ is wavelength, $A_{eff}$ the effective cross-sectional area of the fiber, D the wavelength dispersion value of the fiber, c the velocity of light in a vacuum, $n_2$ the nonlinear optical coefficient of the fiber and $\tau$ pulse full width at half maximum.)

The average optical power $P_{ave-sol}$ after random modulation of a mark rate ½ is expressed by the following equation (2).

$$P_{ave-sol}=0.5 \cdot 1.134 \cdot \pi \cdot P_{sol}/T \tag{2}$$

(where T is a reciprocal of the bit rate.) Here, to enable the soliton transmission over the optical amplifier repeater system which uses optical fibers having losses, Eq. (2) is set to provide the average optical power per repeater section of the fiber $P_{pass-ave}$.

Incidentally, letting the gain of each optical amplifier be represented by G, the relationship between the average power per repeater section $P_{pass-ave}$ and the average power at the input end of the fiber $P_{input}$ is expressed as follows:

$$P_{input}=(GlnG)/G(G-1)P_{pass-ave} \tag{3}$$

Then the inventors of this invention calculated the input power to the fiber (the optical amplifier output power) by Eq. (3). As for the power level, there is a permissible range of 20 to 30% or so.

As described above, the dispersion value of the transmission optical fiber 2 and the amplitude and pulse width of the transmission pulse are so set as to satisfy the soliton conditions in the optical amplifier repeater system.

The optical soliton receiving device 4 is made up of the optical demultiplexer 6 and optical receivers 404 and 405. The optical demultiplexer 6 comprises an optical splitter 401, optical time-division demultiplexer 402 and 403, amplifiers 408 and 409, and delay circuits 406 and 407.

Figure 2:
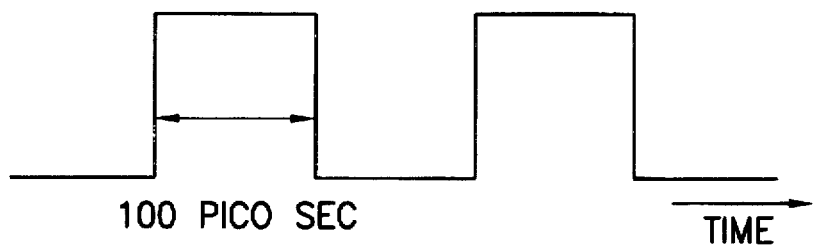
FIG. 2 is a waveform diagram showing the response characteristic of the optical time-division demultiplexer according to the present invention.

The 10 Gb/s multiplexed signals are separated by the optical splitter 401 into two optical signals, which are fed to the optical time-division demultiplexers 402 and 403, respectively. The optical time-division demultiplexers 402 and 403 are each formed by an InGaAsP electroabsorption type optical modulator. The optical time-division demultiplexers 402 and 403 are driven by signals which are obtained by adding DC voltages to sine-wave voltages produced by amplifying, with the amplifiers 408 and 409, 5 GHz clock pulses extracted by the optical receivers 404 and 405. As shown in FIG. 2, the optical time division demultiplexers 402 and 403 each generate a rectangular optical gate waveform of a 100 ps duration and, by using different delay values for the delay circuits 406 and 407, the pulse train of one of the channels is selected in synchronism with the transmitted optical signal.

To prove the effectiveness of this embodiment, the inventors of this invention equivalently implemented a 9000 km optical transmission line by circulating an optical signal 100 times through an optical fiber loop formed by a 91 km long optical fiber and four optical amplifiers.

In the transmitting device 1 time-division multiplexing was adopted and in the receiving device the signal multiplexed to 10 Gb/s was demultiplexed by the optical demultiplexer 6 to 5 Gb/s low-speed signals; it was found that the acceptable range for timing jitter occurring during transmission could be enlarged to be about 1.5 times as compared with the permissible range when directly receiving the 10 Gb/s signal.

Conventionally, in the case of performing a large-capacity transmission using signals time-division multiplexed on the time axis with a high density, interference between adjacent soliton pulses causes the timing jitter, degrading the transmission characteristic. In addition, it is known that when only two isolated or separated soliton pulses exist, the interference could be reduced by making their amplitudes to be slightly different, but no study has been given to an actually modulated optical soliton pulse train. In this embodiment, relatively close soliton pulses with a 4.5 pulse-separation to pulse-width ratio were used for a randomly modulated signal, whereby alternating-amplitude soliton pulses were produced through time-division multiplexing.

Figure 3:
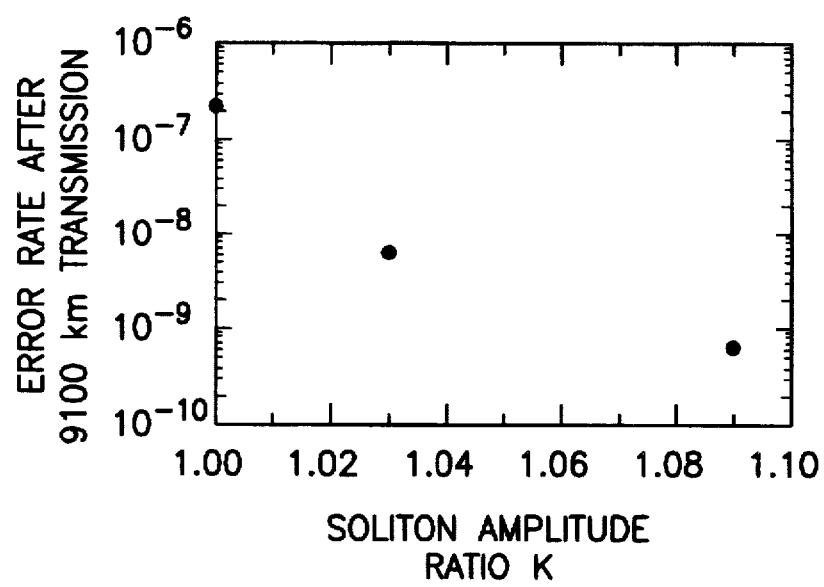
FIG. 3 is a graph explanatory of improved error rate characteristics after 9100 km transmission for different amplitude ratios of alternating-amplitude solitons according to the present invention.

FIG. 3 shows bit error rates after 9100 km transmission for different soliton amplitude ratios. The amplitude ratio k is defined by (large amplitude)/(small amplitude). The bit error rate decreased with an increase in the amplitude ratio. The error rate for k=1 was $2 \times 10^{-7}$, but the error rate for k=1.09 was reduced down to $6 \times 10^{-10}$; that is, the error rate was improved by more than two orders of magnitude. The amplitude ratio was further increased to k=1.3, for which the error rate was $2 \times 10^{-8}$. Thus, it has been confirmed that over the range from a small amplitude ratio k=1.02 to a relatively large ratio k=1.3, the error rate is improved over one order of magnitude than in the case of k=1.

While in this embodiment the short-pulse light source has been described to be formed by a single-wavelength laser and an electroabsorption type optical modulator, it may be formed by a mode-locking laser.

Although the optical time-division multiplexing has been described to be 2-multiplexing, the transmission capacity could be further enlarged by 4-multiplexing or 8-multiplexing, permitting a long-distance optical soliton communication at a transmission rate over 20 Gb/s.

For example, a 20 Gb/s signal is obtained by time-division 4-multiplexing in such a manner as mentioned below. A 5 GHz return-to-zero optical pulse is divided by an optical splitter into two; the respective outputs are further divided by optical splitters into two to obtain four outputs; the four outputs are each modulated by an optical modulator using a digital modulating signal; the four optical modulator outputs are separated into two groups each consisting of two outputs; one of the two outputs of each group is delayed by an optical delay circuit; the two delayed outputs are each multiplexed by an optical coupler into two 10 Gb/s signals; one of the two 2-multiplexed outputs is delayed by an optical delay circuit; and these two outputs are further multiplexed by an optical coupler into four 20 Gb/s signals. It is also possible that three of the four outputs from this optical coupler are delayed by three optical delay circuits and these four outputs are multiplexed by a four-input optical coupler into four 20 Gb/s signals.

[Embodiment 2]

Figure 4:
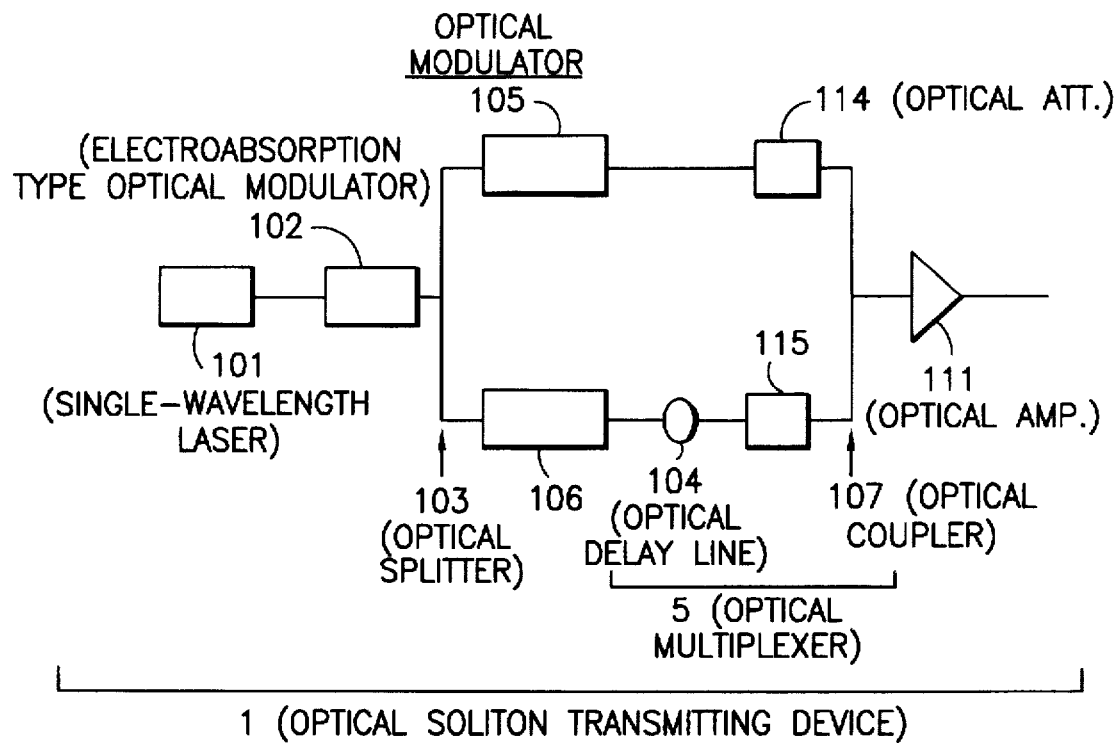
FIG. 4 is a block diagram explanatory of Embodiment 2 of the present invention.

FIG. 4 illustrates Embodiment 2 of the present invention.

The optical soliton transmitting device 1 comprises a single-wavelength laser 101, an electroabsorption type optical modulator 102, an optical splitter 103, an optical delay line 104, optical modulators 105 and 106, an optical coupler 107, optical attenuators 114 and 115 and an optical amplifier 111 containing an optical bandpass filer for eliminating noise.

The oscillation wavelength of the single-wavelength laser 101 is 1556 nm. A 7.1 V reverse bias and a 5 GHz sine-wave voltage of 27 dBm are fed to the InGaAsP electroabsorption type optical modulator 102 to generate a train of optical soliton pulses each having a 22 ps duration. The soliton pulse train is divided by the optical splitter 103 into two pulse trains, one of which is subjected to a 5 Gb/s pseudo-random modulation by the optical modulator 105 and the other of which is delayed by the optical delay line 104 for 100 ps and then subjected to a 5 Gb/s pseudorandom modulation by the optical modulator 106. The optical signals of the both channels are combined by the optical coupler 107, generating a time-division multiplexed 10 Gb/s pseudorandom optical signal. The optical attenuators 114 and 115, provided at the stage preceding the optical coupler 107, are used to change the amplitude values of the optical pulses of the respective channels. In this way, the alternating-amplitude soliton pulses are produced. The optical amplifier 111 is used to amplify the optical signal to a light intensity which satisfies the soliton conditions. The optical transmitting device 1 may include an optical amplifier for compensating for a loss by each optical part.

To demonstrate the effectiveness of this embodiment, the inventors of this invention equivalently implemented a 9000 km optical transmission line by circulating an optical signal 100 times through an optical fiber loop formed by a 91 km long optical fiber and four optical amplifiers. The fiber dispersion value and the optical amplifier output power were set so that the average values of optical soliton pulses of different amplitudes in the two channels would satisfy the soliton conditions in the optical amplifier repeater system. In the transmitting device, time-division multiplexing was adopted, whereas in the receiving device a signal multiplexed to 10 Gb/s was received after being demultiplexed by the optical demultiplexer 6 to a 5 Gb/s low-speed signal.

Bit error rates after the 9100 km transmission for different amplitude ratios (large amplitude/small amplitude) of the soliton pulses of the respective channels were measured for different attenuation values of the optical attenuators 114 and 115. From the results of measurements it has been found that the bit error rate for the amplitude ratio from 1.02 to 1.3 was improved over one order of magnitude than in the case of soliton pulses of the same amplitude.

In this embodiment, the optical attenuators are used to provide an amplitude difference between adjacent pulses but they may be replaced by optical amplifiers.

[Embodiment 3]

Figure 5:
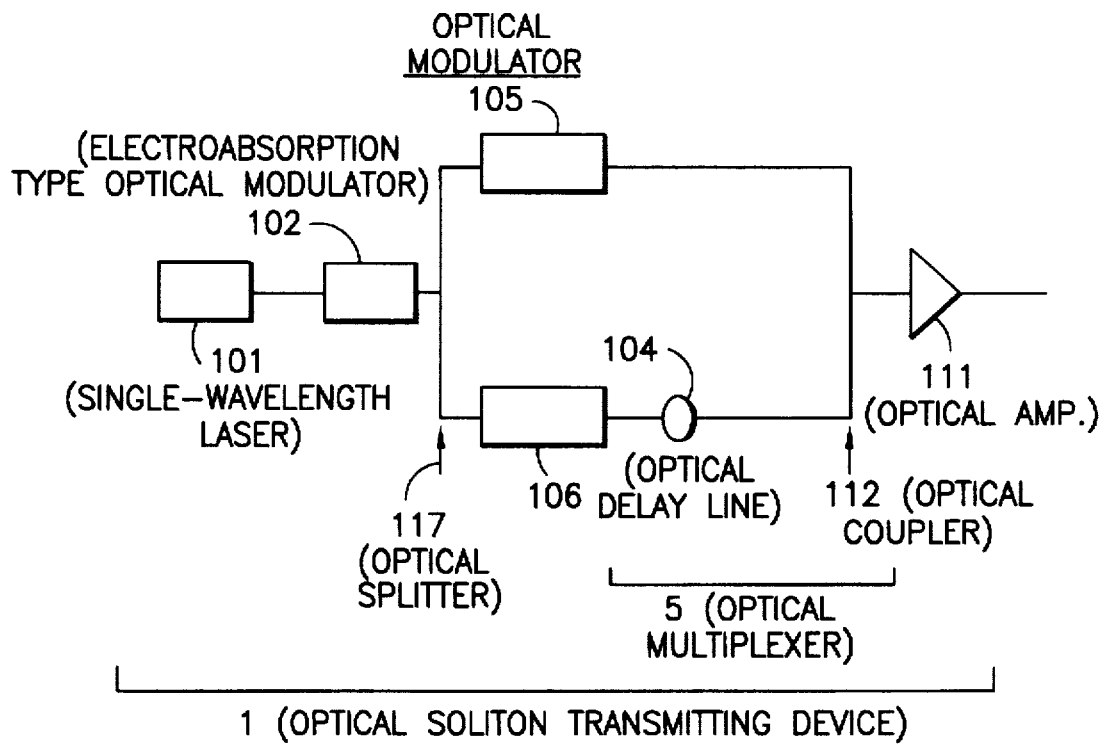
FIG. 5 is a block diagram explanatory of Embodiment 3 of the present invention.

FIG. 5 illustrates the layout of the optical transmitting device of a third embodiment. In this embodiment, the optical splitter 103 and optical coupler 107 used in Embodiment 2 of FIG. 4 are substituted by optical splitters 117 and optical coupler 112 of different branching ratios to generate time-division multiplexed alternating-amplitude soliton pulses without using optical attenuators.

According to this embodiment, since the branching ratio of the alternating amplitude is set to a predetermined value, the system configuration is simplified, needs no adjustment and is excellent in long-term stability.

[Embodiment 4]

Figure 6:
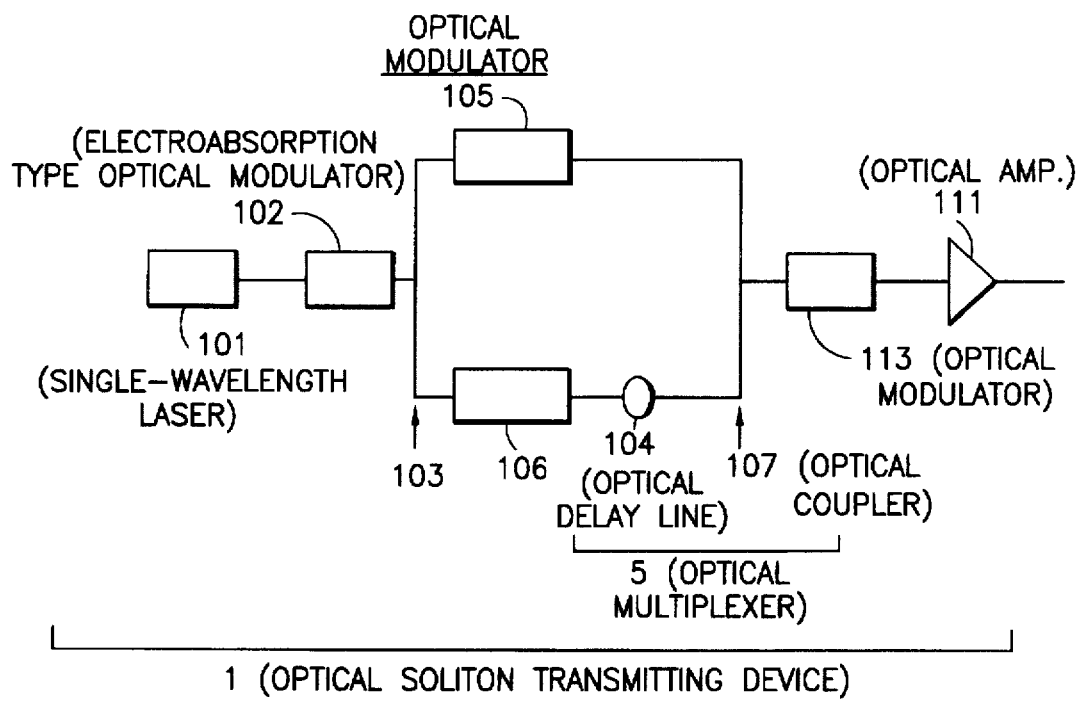
FIG. 6 is a block diagram explanatory of Embodiment 4 of the present invention.

FIG. 6 illustrates the optical transmitting device according to a fourth embodiment of the invention. In this embodiment, constant-amplitude soliton pulses are multiplexed first and then modulated by an optical modulator 113 at a rate one-half the transmission rate to generate alternating-amplitude soliton pulses.

This embodiment features easy setting of the amplitude ratio of the alternating-amplitude soliton pulses. Embodiments 1, 2, 3 and 4 adopt 2-multiplexing as optical time-division multiplexing, but the transmission capacity could be further enlarged by 4-multiplexing and 8-multiplexing; this permits long-distance optical soliton communications at transmission rates above 20 Gb/s.

The 20 Gb/s signal can be implemented by time-division 4-multiplexing in such a manner as mentioned below. That is, a 5 GHz pulse train is branched by an optical splitter into two pulse trains; they are each branched by an optical splitter into two channels; an optical modulator and an optical delay circuit are provided in each channel; the pulse trains are each multiplexed to 10 Gb/s; and the multiplexed outputs are further multiplexed by an optical coupler to 20 Gb/s. The alternating amplitude can be implemented by the means described above in connection with Embodiments 1, 2, 3 and 4.

While Embodiments 1, 2, 3 and 4 employ the single-wavelength laser 101 and the electroabsorption type optical modulator 102 as the short-pulsed light source, it is possible to use any short-pulse light sources such as a gain switch semiconductor laser or mode-locked laser. In particular, when the multiplexing degree is large, extremely narrow or short optical pulses are needed; to meet this requirement, it is possible to employ a pulsed light source of a construction wherein the output light from the single-wavelength laser 101 is modulated by an electroabsorption type optical modulator at the repetition frequency of the transmission rate to generate a short-pulse train and this pulse train is time-division demultiplexed by an electroabsorption type optical modulator down to 1/the multiplexing degree (4, for example) to output a largely-separated pulse train.

[Embodiment 5]

Figure 7:
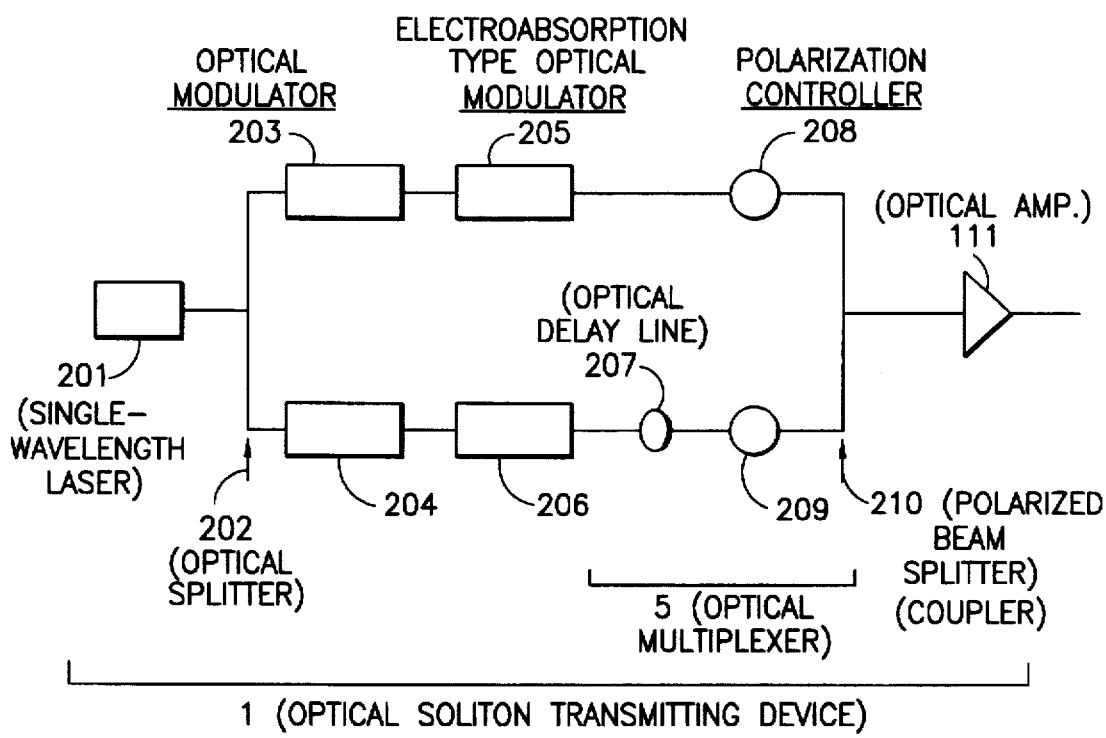
FIG. 7 is a block diagram explanatory of Embodiment 5 of the present invention.

FIG. 7 illustrates the layout of the optical transmitting device according to a fifth embodiment of the invention. The illustrated optical transmitting device is composed of a single-wavelength laser 201, an optical splitter 202, optical modulators 203 and 204, electroabsorption type optical modulators 205 and 206, an optical delay line 207, polarization controllers 208 and 209, a polarized beam coupler 210 and an optical amplifier 111 including an optical bandpass filter for noise elimination use.

The output from the single-wavelength laser 201 is branched by the optical splitter 202 into two signals, which are subjected to 5 Gb/s NRZ pseudorandom modulation by the optical modulators 205 and 206, respectively. The respective NRZ modulated optical pulses are fed to the InGaAsP electroabsorption type optical modulators 205 and 206 wherein they are modulated by a synchronized signal with a 5 GHz sinusoidal modulating voltage superimposed on a bias voltage and from which soliton pulses are generated. One of the two pulse trains is delayed by the optical delay line 207 for 100 ps, after which the optical signals of the two channels are controlled by the polarization controllers 208 and 209 so that their states of polarization intersect at right angles, and then the optical signals are combined by the polarized beam coupler 210. By slightly shifting the state of polarization of the one optical signal from its perpendicular intersection with the state of polarization of the other optical signal or by applying slightly different bias voltages to the electroabsorption type optical modulators 205 and 206, the amplitude ratio can be adjusted. By this, it is possible to obtain alternating-amplitude soliton pulses with amplitudes, pulse widths and polarization states of adjacent pulses alternated.

In Embodiment 2 adjacent soliton pulses are held in the same state of polarization, but by setting the optical signals of the two channels in the transmitting device so that they intersect perpendicularly in the state of polarization, interference between adjacent soliton pulses could be further reduced. Moreover, since the pulse widths of the optical signals of the two channels can be controlled independently of each other, the pulse widths can be changed in accordance with the amplitude ratio used. This provides a feature that the optical soliton signals of alternating-amplitude soliton pulses in the both channels satisfy the soliton conditions.

According to this embodiment, since the interference between adjacent soliton pulses can be reduced more than in Embodiment 2, time-division multiplexing with higher density on the time axes becomes possible, permitting large-capacity transmission.

Although in this embodiment the optical modulators for NRZ random modulation use precede the optical modulators for obtaining soliton pulses, it is evident that the former may follow the latter.

As described above in detail, according to the prior art, it is necessary that a narrow band optical filter, which is very difficult to implement, be disposed for each repeater on the transmission line, or that a 2R repeater, which performs waveform shaping by the use of a high-speed optical modulator, be disposed at intervals of several repeaters. In contrast thereto, the present invention involves any particular control on the transmission line, and hence increases the freedom of design, allowing easy construction of a highly reliable long-distance, large-capacity optical soliton communication system.

What we claim is:

1. An optical communication system, comprising:
   an optical fiber transmission line having a required number of optical amplifier repeaters connected to a transmission optical fiber at required intervals,
   an optical transmitting device for transmitting over said optical fiber transmission line optical multiplexed signals obtained by optical time-division multiplexing return-to-zero optical pulses having digital information, and
   an optical receiving device having an optical demultiplexer for receiving and demultiplexing said optical multiplexed signals received from said optical fiber transmission line into original optical signals, an average wavelength dispersion value of said transmission optical fiber, an optical output intensity of each of said optical amplifier repeaters and widths of said return-to-zero optical pulses being determined so as to compensate for a pulse compression effect by a nonlinear optical effect produced on said optical pulses and a pulse spreading effect by a wavelength dispersion effect produced on said optical pulses.

said optical transmitting device further comprising an optical multiplexer for time-division multiplexing said return-to-zero optical pulses into said optical multiplexed signals to have alternate amplitudes of said return-to-zero optical pulses;

said optical demultiplexer in said optical receiving device comprising an optical splitter for branching said optical multiplexed signals into a plurality of optical signals and an optical time-division demultiplexer for dividing each repetition rate of each branched optical signal to an original transmission rate by a rectangular synchronizing optical gate of a width about the same as the full time slot at a transmission rate after multiplexing.

2. An optical communication system according to claim 1, in which said optical transmitting device comprises pulsed light source means for generating said return-to-zero optical pulses, an optical splitter for branching the output from said pulsed light source means into a plurality of outputs, a plurality of optical modulators for modulating the respective outputs from said optical splitter by modulation signals, and said optical multiplexer time-division multiplexing the outputs from said plurality of optical modulators on a bit-interleave basis; and said optical multiplexer comprising an optical coupler for combining the output from one of said optical modulators and a delayed at least one modulated output from at least one of said optical modulators, and means for alternating the amplitudes of said return-to-zero optical output pulses from said optical coupler.

3. An optical communication system according to claim 1, in which, said optical transmitting device comprises, a single-wavelength laser for continuously emitting light of a fixed amplitude; an optical splitter for branching the output from said single-wavelength laser into a plurality of outputs; a plurality of optical modulators, each modulating one of said plurality of outputs by a modulating signal; a plurality of optical soliton pulse train generating parts which receive the outputs from said optical modulators and generate return-to-zero optical pulses; and said optical multiplexer for time-division multiplexing the outputs from said optical soliton pulse train generating parts on a bit-interleave basis; and said optical multiplexer comprising an optical coupler whereby the modulated output from one of said plurality of optical modulators, which has passed through one of said plurality of optical soliton pulse train generating parts, is combined with a delayed at least one modulated output from at least one other of said plurality of optical modulators which has passed through the other of said plurality of optical soliton pulse generating parts; and means for alternating the amplitudes of output return-to-zero optical pulses from said optical coupler.

4. An optical communication system according to claim 2 or 3, in which said means for alternating the amplitudes of said output return-to-zero optical pulses comprises a plurality of polarization controllers disposed before said optical coupler for said modulated output and said delayed modulated output, respectively; and a polarizer provided after said optical coupler.

5. An optical communication system according to claim 2 or 3, in which said means for alternating the amplitudes of said output return-to-zero optical pulses comprises a plurality of attenuators disposed before said optical coupler for said modulated output and said delayed modulated output, respectively.

6. An optical transmitting device, for transmitting return-to-zero optical pulses having digital information after time-division multiplexing comprising:

pulsed light source means for generating said return-to-zero optical pulses;

an optical splitter for branching an output from said pulsed light source into a plurality of outputs;

a plurality of optical modulators for each modulating one of the outputs from said optical splitter by a modulating signal; and an optical multiplexer for time-division multiplexing the outputs from said plurality of optical modulators on a bit-interleave basis;

said optical multiplexer having an optical coupler for combining the modulated output from one of said plurality of optical modulators and a delayed at least one modulated output from at least another one of said plurality of optical modulators.

7. An optical transmitting device, for transmitting return-to-zero optical pulses having digital information after time-division multiplexing, comprising:

pulsed light source means for generating said return-to-zero optical pulses, said pulsed light source means comprising a single wavelength laser for continuously emitting light of a fixed amplitude;

an optical splitter for branching the output from said single-wavelength laser into a plurality of outputs;

a plurality of optical modulators for each modulating one of said plurality of outputs by a modulating signal;

a plurality of optical soliton pulse train generating parts which receives the outputs from said optical modulators and generate return-to-zero optical pulses; and an optical multiplexer for time-division multiplexing the outputs from said optical soliton pulse train generating parts on a bit-interleave basis;

said optical multiplexer having an optical coupler whereby the modulated output from one of said plurality of optical modulators, which has passed through one of said plurality of optical soliton pulse train generating parts, is combined with a delayed at least one modulated output from at least one of said plurality of optical modulators.

8. An optical transmitting device according to claim 6 or 7, further comprising:

a plurality of polarization controllers disposed before said optical coupler for controlling polarities of said modulated output and said delayed modulated output, respectively, and a polarizer disposed after said optical coupler to successively alternate amplitudes of said output return-to-zero optical pulses.

9. An optical transmitting device according to claim 6 or 7, further comprising:

a plurality of attenuators disposed before said optical coupler for said modulated output and said delayed modulated output, respectively, to successively alternate amplitudes of said return-to-zero optical pulses.

10. An optical transmitting device according to claim 6 or 7, further comprising:

a plurality of optical amplifiers disposed before said optical coupler for said modulated output and said delayed modulated output, respectively, to successively alternate amplitudes of said return-to-zero optical outputs.

11. An optical transmitting device according to claim 6 or 7, wherein means is disposed for changing at least one of the branching ratio of said optical splitter and a combining ratio of said optical coupler to successively alternate amplitudes of said return-to-zero optical pulses.

12. An optical transmitting device according to 6 or 7, wherein said means for successively alternating the amplitudes of said return-to-zero optical pulses comprises an optical modulator which modulates the output from said optical coupler by a sinusoidal or rectangular wave of a speed one half the transmission rate after multiplexing.

13. An optical transmitting device according to claim 6 or 7, wherein said optical coupler comprises a polarized beam splitter, and a plurality of polarization controllers are disposed before said polarized beam splitter for said modulated output and said delayed modulated output, respectively, to generate alternating-amplitude optical signals of perpendicularly intersecting states of polarization.

* * * * *